Oct. 6, 1970    L. NELSON    3,531,865
SCRIBING DEVICE
Filed April 3, 1969    2 Sheets-Sheet 1
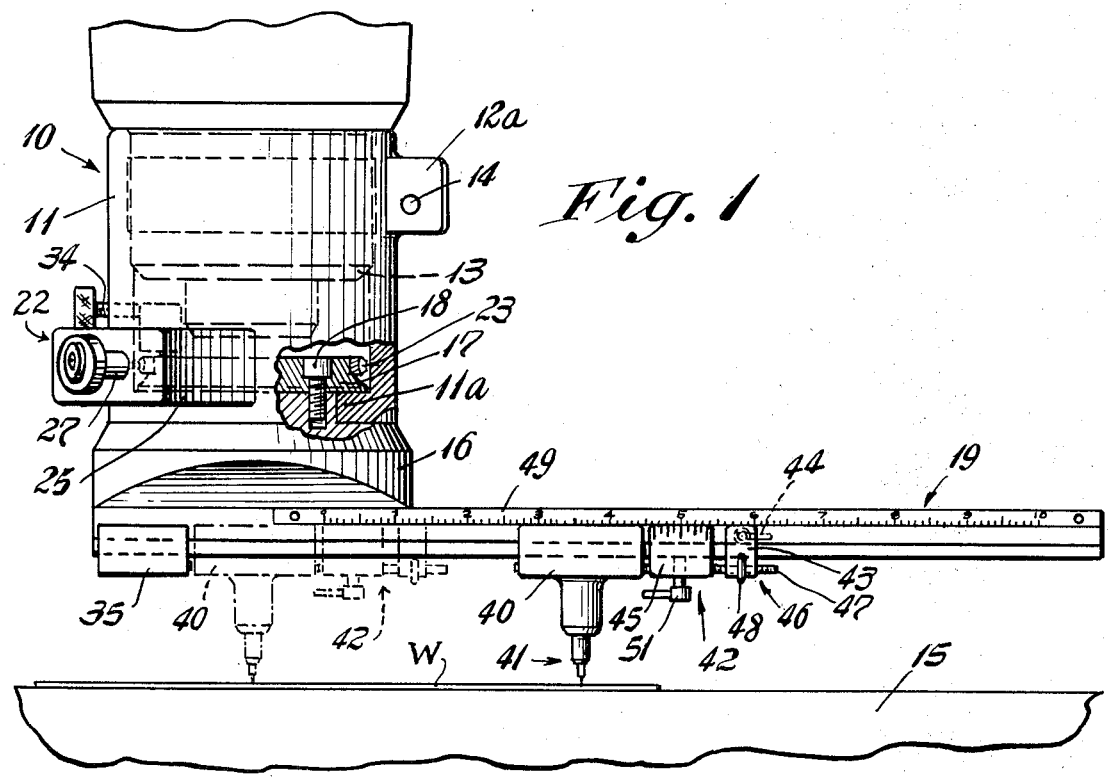
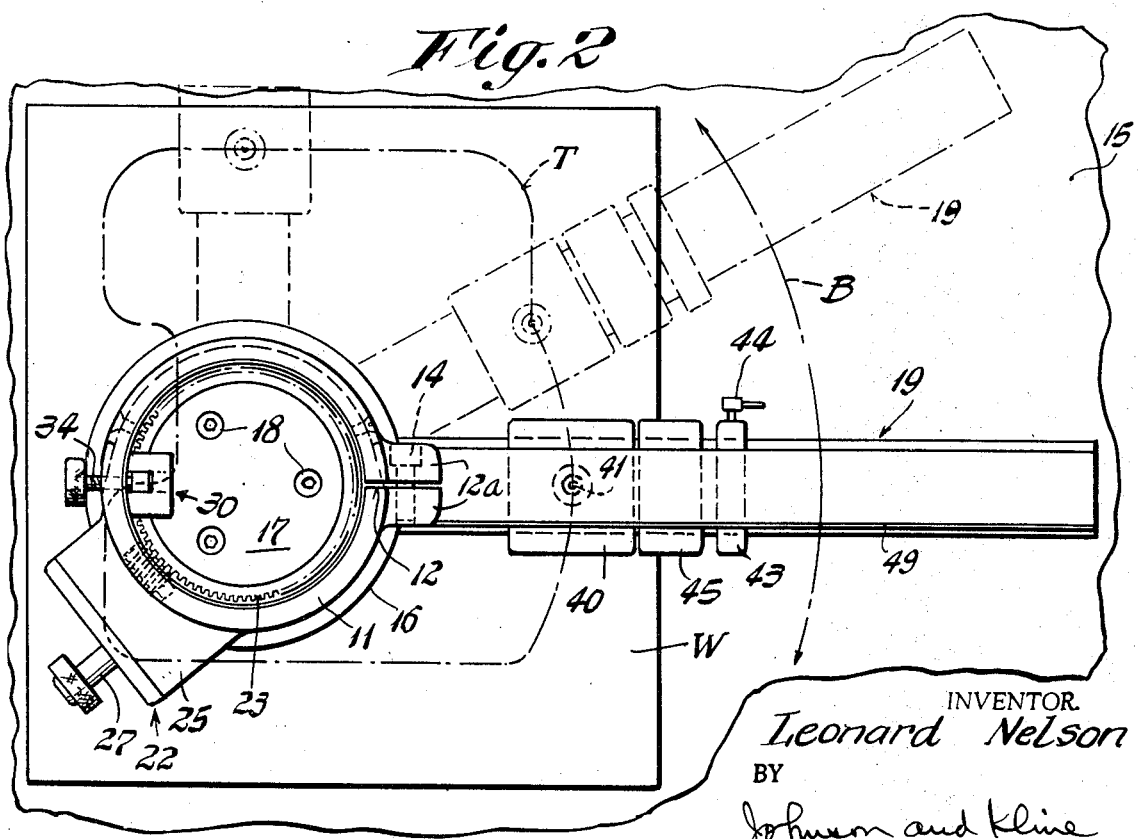
INVENTOR.
Leonard Nelson
BY
Johnson and Kline
ATTORNEYS Oct. 6, 1970   L. NELSON   3,531,865
SCRIBING DEVICE
Filed April 3, 1969   2 Sheets-Sheet 2
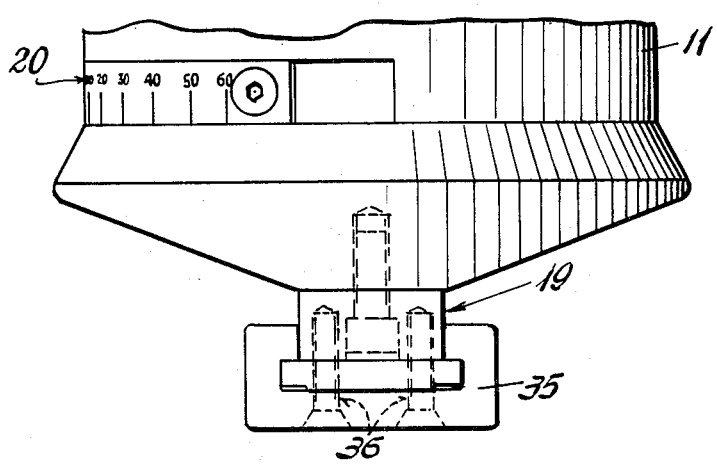
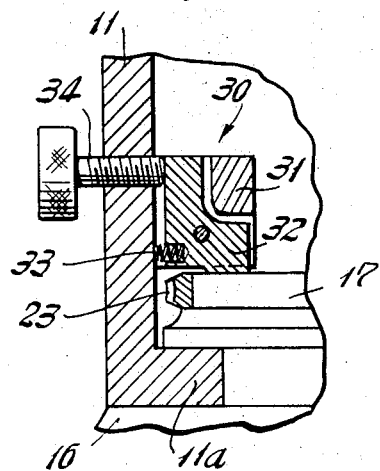
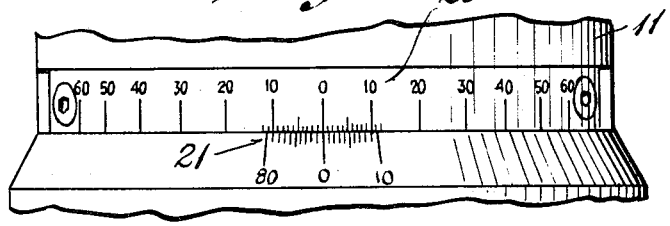
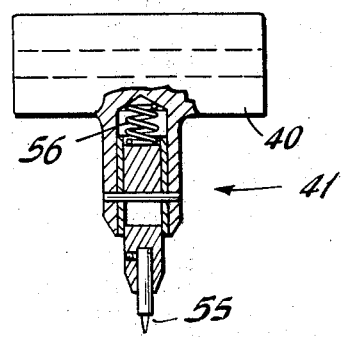
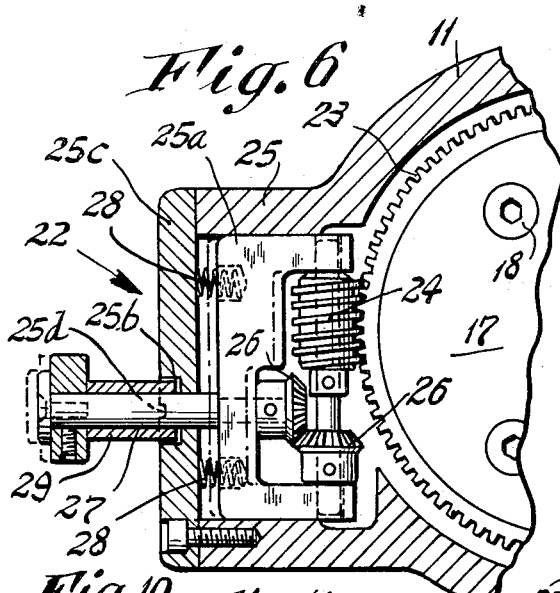
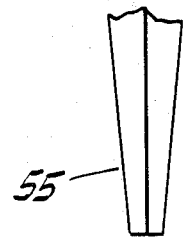
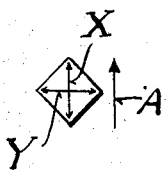
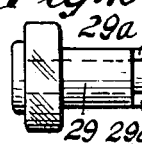
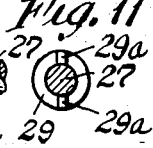
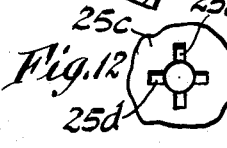
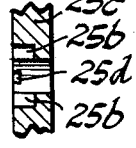
INVENTOR.
Leonard Nelson
BY
Johnson and Kline
ATTORNEYS

United States Patent Office 3,531,865
Patented Oct. 6, 1970

3,531,865
SCRIBING DEVICE
Leonard Nelson, Trumbull, Conn., assignor to Custom Tool & Machine Co. Inc., Monroe, Conn., a corporation of Connecticut
Filed Apr. 3, 1969, Ser. No. 813,263
Int. Cl. B43l 9/04
U.S. Cl. 33—26
6 Claims

ABSTRACT OF THE DISCLOSURE

A scribing device adapted to be mounted on a machine tool for accurately scribing, on a workpiece, template or the like, circles, arcs or angularly related straight lines by having a scriber slidably mounted on an angularly adjustable arm and having adjustable stop means for engaging and limiting the movement of the scriber.

---

Heretofore, as shown in U.S. Pat. No. 3,135,051, scribers were mounted on a subslide carried by a slide movable to predetermined positions and locked by a spring bolt to an arm. The subslide was adjusted on the slide but this had many limitations as the captive subslide carrying the scriber is limited in its movements.

The present invention provides a scribing device which is easily operated to scribe accurately on a workpiece, template, or the like, circles, arcs, or angularly related straight lines. This is accomplished by having a rotary member mounted on a mounting means for rotation with respect thereto about an axis thereof. The rotary member has a rigid straight arm extending radially therefrom with its axis passing through the axis of the mounting means. A slide carrying a scriber is freely slidable on the arm to move the scriber from a normal position in alignment with the axis of the mounting means. The arm carries accurately adjustable stop means for limiting the movement of the slide from the normal position to produce straight lines of predetermined accurate length. By accurately adjusting the rotary member with respect to the mounting means by means of a fine adjustment drive and locking it in adjusted position the angular position of the arm can be determined, and accurate, angularly related straight lines can be produced by sliding the slide and scriber therealong. Also accurate arcs and circles can be produced by setting the stop to limit the movement of the scriber from the normal position a distance equal to the radius of the circle or arc and rotating the rotary member and the arm.

Another feature of the invention resides in a novel scriber for producing a template on a coated glass or plastic film, which scriber cleanly removes the coating during either straight line or arcuate movement of the scriber by the device.

Other features and advantages of the invention will be apparent from the specification and claims when considered in connection with the accompanying drawings in which:

FIG. 1 is a side view, partly in section, showing the scribing device of the present invention.

FIG. 2 is a top view of the scribing device.

FIG. 3 is an enlarged end view showing the mounting of the arm on the rotary member.

FIG. 4 shows the cooperating scales on the mounting and rotary members.

FIG. 5 is a detailed view, in section, of the locking means for the rotary member.

FIG. 6 is a sectional view of the adjusting means for the rotary member.

FIG. 7 is a view, partly in section, of the slide and scriber thereon.

FIG. 8 is an enlarged detail of the scriber point.

FIG. 9 is a bottom view of the scriber point.

FIG. 10 is a detail view of the sleeve on the fine adjustment drive.

FIG. 11 is an end view from the right in FIG. 10.

FIG. 12 is a fragmentary view of the cover plate showing the recesses.

FIG. 13 is a sectional view of FIG. 12.

While the scribing device of the present invention can be employed in many ways, it is herein illustrated as being applied to a usual milling machine having a vertically disposed quill and a movable table. As shown in FIG. 1, the scribing device has a mounting member 10 in the form of a sleeve 11 with a split portion 12 which is adapted to slide over the vertically disposed quill 13 of the milling machine. It is fixedly clamped in position thereon by a clamping bolt 14 extending through ears 12a in the split portion of the sleeve to securely fix the scribing device in position above the usual movable table 15 of the milling machine upon which the workpiece W or template sheet to be scribed is positioned.

The scribing device includes a rotary member 16 rotatably mounted in the open end of the sleeve 11 and secured in position by a plate 17 overlying an inturned flange 11a on the end of the sleeve and secured to the rotary member by bolts 18.

The rotary member has secured thereto a straight rigid arm 19 which projects radially therefrom and has its longitudinal axis aligned with the axis of the quill and the rotary member as shown in FIG. 2. The arm will be angularly adjusted with respect to the axis of the quill upon rotation of the rotary member on the sleeve.

It will be noted in FIG. 4 that the rotary member and mounting means have cooperating scales 20, 21 (FIG. 4) whereby the angular adjustment of the rotary member and the arm with respect to the mounting member can be accurately determined.

To aid in obtaining greatest accuracy in the adjustment of the rotary member, there is, as shown in FIG. 6, a fine adjustment drive 22 comprising a gear 23 formed on or otherwise fixed to the edge of the plate 17 cooperating with a worm 24 rotatably mounted on a slidable bracket 25a in housing 25 on the sleeve 11. The worm is driven through bevelled gears 26 on the bracket by a manually rotatable shaft 27. Thus, very fine adjustments of the angular position of the rotary member and the arm to within an arc of one minute can be achieved.

The bracket for the fine adjustment drive is normally urged into the position shown in FIG. 6 by springs 28. In this position the gears 23, 24 are in driving relation. To disable the fine adjustment drive to enable the rotary member to be freely adjusted, there is a sleeve 29 rotatably carried by shaft 27. The sleeve has at its inner end lugs 29a which are adapted to be located in deep recesses 25b (FIGS. 6, 12 and 13) of cover 25c when the bracket is in driving position. By withdrawing the bracket against the urging of the springs 28 to the dot-and-dash position of FIG. 6 and rotating the sleeve so that the lugs 29a engage the shallow recesses 25d of the cover, the gear 24 is held out of engagement with the gear 23, thus enabling the rotary member to be freely turned.

After the adjustments are made, a brake means 30, as shown in FIG. 5, is applied to lock the rotary member in adjusted position. The brake means comprises a bracket 31 on the mounting means having a pivoted brake shoe 32 thereon normally urged out of engagement with the plate 17 by means of a spring 33. It is movable against the urging of the spring into locking relation by a threaded adjustment screw 34.

Mounted on the arm 19 is a slide 40 which is freely movable along the arm and which carries a scriber 41 on its underside. The scriber is normally positioned by block 35 as shown in the dash lines of FIG. 1 with its axis aligned with the axis of the quill. The block is secured to the arm as shown in FIG. 3 by the bolts 36.

To control the movement of the slide, the present invention provides a stop means 42 which is slidably and adjustably mounted on the arm 19. The stop means 42 comprises a first member 43 adapted to be clamped to the arm in a predetermined selected position by means of the screw clamp 44 and a stop block 45 which is slidable on the arm but is connected to the first member 43 by means of an adjustable connection 46. The adjustable connection 46 comprises a threaded shaft 47 on one member and a cooperating captive nut 48 on the other. The arm is provided with indicia 49 and the stop block 45 is provided with indicia whereby it can be accurately located to within .001" with respect to the axis of the quill by the adjustable connection 46. After the stop member has been accurately positioned, it is clamped to the arm by the threaded clamping bolt 51. The stop block will limit the movement of the slide along the arm.

With this construction, it will be seen that when it is desired to make a straight line of a predetermined length and angularity, it is merely necessary to adjust the arm to the desired angular position, adjust the stop block, and run the slide carrying the scriber along the arm until it engages the stop block. If it is desired to provide circles, the stop block is positioned to limit the outward movement of the slide a distance equal to the radius of the circle and then by releasing the brake means 30 on the rotary member, the arm can be swung through an arc or a circle as required.

By adjusting the workpiece to the required position, it will be seen that the scriber can very accurately and quickly produce a template T having the required circular portion, arcs and angularly related straight lines as shown in the dot-and-dash lines of FIG. 2.

While the scriber can take various forms, it has been found that when scribing templates T on a sheet W of coated plastic film or glass, it is highly desirable to use a scriber such as shown in FIGS. 7-9. The scriber 41 has the scriber element 55 resiliently mounted on the slide and urged into contact with the sheet of template material W by the spring 56. The scriber element is provided with a rectangular point, as shown in FIGS. 8 and 9, and is so positioned on the slide that one diagonal axis X is in alignment with the longitudinal axis of the arm and the other diagonal axis Y is perpendicular to the longitudinal axis of the arm so that if a straight line is desired, the movement of the slide along the arm in the direction of the arrow A will cause the sharp edge to penetrate the coating and clearly remove the coating from the surface of the plastic sheet or glass, and if the arm is swung through an arc, such as shown by the arc B in FIG. 2, the other edge will serve to remove the coating from the plastic sheet, thus providing a clean scribed outline.

Variations and modifications may be made within the scope of the invention and portions of the improvements may be used without others.

I claim:

1. In a scribing device comprising a nonrotatable mounting member having a predetermined axis, a rotary member supported on the mounting member for rotation about said axis, a straight rigid arm secured to the rotary member to extend axially therefrom, said rotary member and mounting member having cooperating scales for indicating the angular position of the arm about said axis, and said arm having indicia thereon indicating the distance from said axis, the improvement wherein there is a slide carrying a scriber freely slidable on said arm, said scriber being normally located in line with said axis and provided with a scribing point having a square cross-section and mounted with one diagonal of said point in line with the axis of the arm and the other diagonal of said point disposed at right angles to the axis of the arm, a stop means slidable on said arm and accurately movable to a selected position with respect to the indicia on said arm related to said axis, and means on the stop means for locking it in adjusted position, said stop means engaging the slide and limiting the movement of the slide along said arm from said normal position whereby said slidable scriber can be controlled to make accurate circles, arcs of circles or angularly related straight lines.

2. In a scribing device for use on a machine tool having a movable worktable and a vertically disposed quill and including a mounting member adapted to be secured to said quill, said mounting member comprising a sleeve to receive the quill and having clamping means to secure the sleeve to the quill, said sleeve having an open end provided with an inturned flange, a rotary member supported on the mounting member, said rotary member being mounted on said inturned flange for rotation with respect to said sleeve and about the axis for said quill, a straight rigid arm secured to the rotary member to extend radially therefrom, said rotary member and mounting member having cooperating scales for indicating the angular position of the arm with respect to said axis, the improvement wherein their is a slide carrying a scriber slidable on said arm, said scriber being normally located in line with said axis and adapted to contact with a member supported by said worktable to produce a mark thereon, a stop means adjustable on said arm and comprising a first member slidable on said arm and movable to a selected position on said arm with respect to said axis and a stop block slidable on said arm and adjustably connected to said first member, means on the first member for locking it in selected position, and means on the stop block for locking it in adjusted position, said stop block engaging and limiting the movement of the slide along said arm from said normal position.

3. The invention as defined in claim 1 wherein the stop means comprises a first member slidable on said arm to a selected position on the arm with respect to said axis and a stop block slidable on said arm and adjustably connected to said first member, said first member and stop block having clamping means engaging the arm and constituting the locking means for said stop means.

4. The invention as defined in claim 2 wherein said adjustable connection between said first member and stop block comprises a threaded shaft on one cooperating with a captive nut on the other.

5. The invention as defined in claim 2 wherein said rotary member has a ring gear cooperating with an adjusting gear on the mounting members whereby the position of the rotary member and the angular position of the arm about the axis can be adjusted.

6. The invention as defined in claim 2 wherein the mounting member is provided with a locking means for the rotary member to lock said member in the required rotative position.

References Cited

UNITED STATES PATENTS

| 855,734 | 6/1907 | Terry | 33—40 |
| 1,665,842 | 4/1928 | Brunings | 33—84.5 |
| 2,380,664 | 7/1945 | Miller | 33—174 |
| 2,409,290 | 10/1946 | Lipp | 33—26 |
| 2,801,472 | 8/1957 | Davidiak et al. | 33—143 |
| 3,135,051 | 6/1964 | Reuvers et al. | 33—26 |
| 3,138,875 | 6/1964 | Christensen | 33—18 |

FOREIGN PATENTS

| 572,948 | 3/1933 | Germany. |

HARRY N. HAROIAN, Primary Examiner

PO-1050
(5/69)

UNITED STATES PATENT OFFICE
CERTIFICATE OF CORRECTION

Patent No. 3,531,865          Dated    October 6, 1970

Inventor(s) Leonard Nelson

It is certified that error appears in the above-identified patent and that said Letters Patent are hereby corrected as shown below:

In column 3, line 65 "axially" should read --radially--.

In column 4, line 25 "their" should read --there--; same column, line 52 "members" should read --member--.

Under References Cited, the classification for Brunings patent 1,665,842 should read -- 33--184.5 --.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents